Dec. 6, 1955     S. W. ALDERFER     2,726,186
ORNAMENTAL FABRIC WITH SPONGE RUBBER
BACKING AND METHOD OF MAKING SAME
Filed Nov. 24, 1953
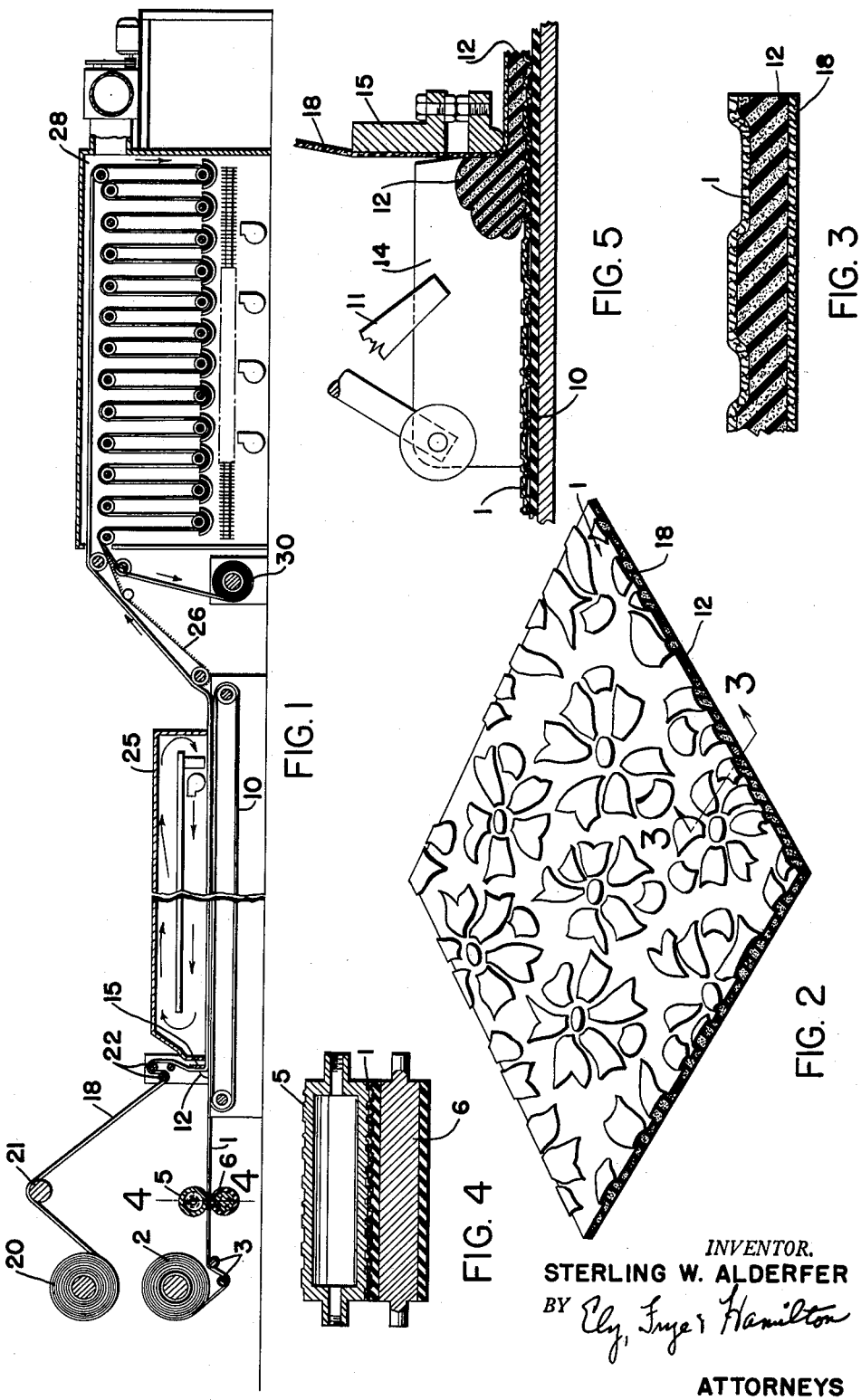
INVENTOR.
STERLING W. ALDERFER
ATTORNEYS

United States Patent Office 2,726,186
Patented Dec. 6, 1955

2,726,186

ORNAMENTAL FABRIC WITH SPONGE RUBBER BACKING AND METHOD OF MAKING SAME

Sterling W. Alderfer, Akron, Ohio, assignor of three-tenths to Edward D. Andrews, Akron, Ohio Application November 24, 1953, Serial No. 394,025

6 Claims. (Cl. 154—100)

The present invention relates to a new and improved material characterized by the presence of an embossed outer layer or ply and a sponge rubber backing of relatively substantial thickness so that the material has a degree of cushioning effect dependent on the thickness and the yielding properties of the sponge rubber layer. Preferably, the fabric also comprises a third or under layer which acts as a reinforcement and holds the material so that the embossing is not lost on handling or in use.

The outer or main layer is preferably of a textile fabric and is one which will take and retain an embossed pattern. Nylon, Orlon, and many of the newer fabrics made from synthetic resinous fibers are adaptable for the invention. Other fabrics made of materials which are adaptable for embossing may be employed. The invention is not limited to fabrics in the narrow sense, but may be used with other sheetings or films of various types, the word "sheeting" being used herein to cover fabrics, films or sheets of material adaptable for the purpose.

The sheeting selected is first embossed with the desired design or ornamentation. This may be done by any well-known means, it being preferred in the case of many synthetic films or fabrics made from synthetic fibers (but not essential) to run the sheeting through heated embossing rolls just before the application of the sponge rubber foam. This will ensure that the sharpness and detail of any design is not lost or impaired by intermediate handling and will be preserved by the immediate application of the foamed latex.

To the reverse or underside of the sheeting is then applied the material which is to constitute the foamed rubber backing. For the purpose it is preferred to employ foamed natural latex which is poured upon and then spread in an even layer of any desired thickness over the sheeting which is face down on a table or belt. The foam will run into and fill all of the depressions in the sheeting so that every raised point on the finished goods is backed up by a sponge rubber filling.

The material which is used is preferably a rubber latex which has been thoroughly beaten into a foam of the desired density. To the latex are added a foaming agent, a gelling or setting agent, and a vulcanizing agent, together with stabilizers and anti-oxidants, all as well known to one familiar with the art of making foamed latex materials. The density of the foam is determinable and may be regulated to meet the conditions of use.

As the foamed latex is poured over the reverse side of the sheeting, it is spread into an even layer by a doctor blade, and at the same time or before the latex foam has gelled there is applied to the surface of the foamed layer a second fabric which covers the foamed layer and to which it adheres. This second layer is for the purpose of reinforcing the ornamental material, primarily with a view to retaining its lateral dimensions. If this were not provided, the soft rubber layer might spread after use or in handling and the spreading of the rubber would tend to flatten out or reduce the embossed configurations on the upper sheeting.

A light muslin may be sufficient for holding the material in its embossed condition although a heavier backing fabric may be used. For some purposes, it may be desirable to use a knitted fabric so that the material may be stretched if desired in covering chairs or car seats. In some embodiments of the invention it is possible to omit the backing layer altogether, and this modification may be used where the material is not to be subjected to forces which tend to dissipate the ornamental embossing.

When the foam is applied it has a thick creamy consistency and readily spreads. After the spreading operation and the application of the backing layer, the composite material is subjected to heat to set the sponge layer and thereafter it is heated to vulcanize the sponge.

Apparatus and methods for accomplishing the setting and subsequent vulcanization are well known in the art, it being preferred to use process and apparatus similar to that shown in applicant's prior United States Patent No. 2,628,654, issued February 17, 1953.

It is preferred to use natural rubber latex for the filling because it is readily available and the technique of foaming and vulcanizing natural latex is well known. This, however, does not preclude the use of artificial latices or other synthetic foams having properties similar to rubber. Where the terms "foamed latex," "latex foam" or "foamed rubber" are used in the specification and claims, it is intended to cover such materials. Where the term "textile fabric" is used in the specification and claims, it will be understood to cover both woven and knitted fabrics.

In the drawings, which are to be taken only as illustrative of the invention and a process for making the new material, Fig. 1 is a schematic view of an apparatus such as shown in my earlier patent referred to above which may be used in the manufacture of the new material.

Fig. 2 is an enlarged view of a rather elaborately embossed material made in accordance with my invention.

Fig. 3 is an enlarged cross-section thereof on the line 3—3 of Fig. 2.

Fig. 4 is a cross-section on the line 4—4 of Fig. 1.

Fig. 5 is an enlarged view of the apparatus taken at the doctor blade where the foam is leveled off and the reinforcing layer of fabric applied.

In the drawings, 1 represents the sheeting which is to form the outer or top layer or surface. As explained, this may be of any type of fabric film or sheet, but it is preferred to use a fabric made of one of the synthetic fibers or a fiber impregnated with one of the artificial resins which will take and retain designs by embossing, such as nylons, Orlon or the like. It is also preferred to use a textile sheet for the purpose so that the finished material will be porous throughout, not only for the purpose of ventilation but also to permit the passage of heated air through the material during vulcanization.

While not essential, it is desirable to emboss the sheeting and then to cover its reverse side with the foamed latex without intermediate handling. In such an embodiment of the invention the sheeting is supplied in a roll 2 and, after passing tensioning devices 3, is passed between the two embossing rolls 5 and 6, the roll 5 being preferably heated to impress an embossed design in the sheeting 1.

From the embossing rolls, the sheeting is led directly to an endless belt 10 which forms a part of the apparatus shown in my prior patent. The embossed sheeting is laid face down and smoothly over the belt, which carries it through the foam applying and setting steps.

Shortly after being laid on the belt 10 a mass of the foamed rubber latex 12 is poured over the sheeting. This is delivered from a continuous foaming device, not shown, and is poured on the reverse side of the sheeting by a funnel or spout 11 which may be moved back and forth to distribute the latex foam, which is restrained from running off the edges of the sheeting by side boards 14.

The movement of the belt brings the sheeting and the mass of unformed foam to a doctor knife or spreader 15 located over the belt and spaced therefrom to give the desired thickness to the filling layer. As shown in Fig. 5, the doctor is preferably made in two parts so as to readily adjust the thickness of the foamed layer 12. In passing through the narrow throat formed by the doctor blade and the belt, the foam will be forced into every depression in the embossing so that every raised part of the sheeting will be supported by the foamed rubber. The foam will penetrate the fabric 1 to a sufficient extent to anchor itself therein.

The doctor is employed to apply the reinforcing layer 18 to the top of the foam. While not essential to all embodiments of the invention, it is desirable that the layer 18 be woven or knitted so as to allow the heated air to pass through the composite sheet during vulcanization. This also allows the foam to penetrate the reinforcing layer and anchor itself therein.

The reinforcing material 18 is supplied from a roll 20 and led over a guide roll 21 and tensioning rolls 22 to the face of the doctor blade. In passing over the doctor blade, it protects the blade from the latex foam.

From the doctor blade, the composite material passes into the chamber 25, where the foam sets and from which the material goes to the tentering belts 26 and thence through the vulcanizing oven 28 where hot air is blown upon and through the composite material, as described in my former patent. The finished composite material is wound up in the roll 30.

It will be seen that a new, decorative, cushioned fabric has been made comprising the outer embossed sheet 1 and the soft yielding sponge rubber cushion or filler 12, preferably with the reinforcing layer 18. The material is especially adapted for upholstering furniture or automobile seats because the foamed rubber layer is porous and with textile fabrics on either side it will ventilate. It is especially valuable because it will retain the embossed pattern indefinitely, yet is soft and yielding. With certain types of outer sheeting, it has the appearance and feel of richly embossed leather. With other types of outer sheeting, lacy effects may be reproduced. Whatever pattern is impressed upon the outer sheet becomes a permanent surface with its irregularities supported by the cured foamed rubber, being connected therewith by a vulcanized bond.

While it is desirable to emboss the outer material as a part of a continuous process, as shown, this is not essential and, while the reinforcing layer helps to preserve the irregularities in the outer layer, this may also be omitted. Other changes and modifications, within the scope of the claims, will be suggested to one skilled in the art.

What is claimed is:

1. The method of manufacturing decorative cushioning material comprising the steps of embossing a sheeting with an ornamental design, flowing a mass of unvulcanized latex foam over the reverse side of the sheeting and filling the depressions therein, leveling off the mass to form a layer of foamed latex having a smooth even surface, applying a second sheeting over the surface of the foam, and then setting the foamed latex and vulcanizing it while in contact with both sheetings.

2. The method of manufacturing decorative cushioning material comprising the steps of embossing a textile fabric with an ornamental design, flowing a mass of unvulcanized latex foam over the reverse side of the fabric and filling the depressions therein, leveling off the mass to form a layer of foamed latex having a smooth even surface, applying a second woven fabric to the surface of the foamed latex and then setting and vulcanizing the foamed latex while in contact with both fabrics.

3. The method of manufacturing cushioning material comprising the steps of passing a textile fabric between embossing rolls to form raised designs therein, and thereafter, and while the fabric is moving, flowing a mass of unvulcanized latex foam over the reverse side of the sheeting, smoothing out the mass of foam to cause it to fill the depressions in the sheeting and to penetrate the sheeting, applying a second fabric to the upper side of the foam, and then setting and vulcanizing the latex foam while in contact with both fabrics.

4. Decorative cushioning material made by the process of claim 1.

5. Decorative cushioning material made by the process of claim 2.

6. Cushioning material made by the process of claim 3.

References Cited in the file of this patent

UNITED STATES PATENTS

| | | |
|---|---|---|
| 2,217,137 | Roth et al. | Oct. 8, 1940 |
| 2,271,058 | Binns | Jan. 27, 1942 |
| 2,341,979 | Cunnington | Feb. 15, 1944 |
| 2,434,527 | Untiedt | Jan. 13, 1948 |
| 2,648,619 | Alderfer | Aug. 11, 1953 |
| 2,652,352 | Murray | Sept. 15, 1953 |